United States Patent [19]

Kanbara et al.

[11] 4,001,010
[45] Jan. 4, 1977

[54] METHOD FOR PROCESSING REDUCED IRON

[75] Inventors: Kenjiro Kanbara; Masayuki Hattori; Satoru Miyasita; Masaaki Iguchi; Jihei Yoda, all of Himeji, Japan

[73] Assignee: Nippon Steel Corporation, Tokyo, Japan

[22] Filed: Aug. 26, 1974

[21] Appl. No.: 500,684

[52] U.S. Cl. .................................................. 75/35
[51] Int. Cl.² ....................................... C21B 13/02
[58] Field of Search ..................... 75/26, 34, 35, 91

[56] References Cited
UNITED STATES PATENTS 2,860,046  11/1958  Edstrom et al. .................. 75/91
3,816,101  6/1974  Beggs et al. ..................... 75/35

Primary Examiner—M. J. Andrews
Attorney, Agent, or Firm—Toren, McGeady and Stanger

[57] ABSTRACT

Method and apparatus for processing reduced iron in which granular iron oxide charged into a vertical furnace is reduced by a reducing gas comprising mainly carbon monoxide and hydrogen, a substantial portion of the waste gas generated in the reduction process being regenerated in a recirculating system. The reduced iron which has been reduced in the vertical furnace is continuously discharged at a temperature above 500° C under isolation from the exterior atmosphere and is received in a plurality of air tight, sealable component adjusting receptacles. The reduced iron received in the receptacles is subjected to component adjustment at a temperature ranging from 700° to 1100° C by using the regenerated reducing gas and, thereafter, it is discharged from the receptacles under isolation from the exterior atmosphere so as to be received in air tight sealable cooling receptacles thereby cooling the same to a temperature lower than 100° C, the reduced iron being thereafter discharged from the receptacles.

4 Claims, 2 Drawing Figures

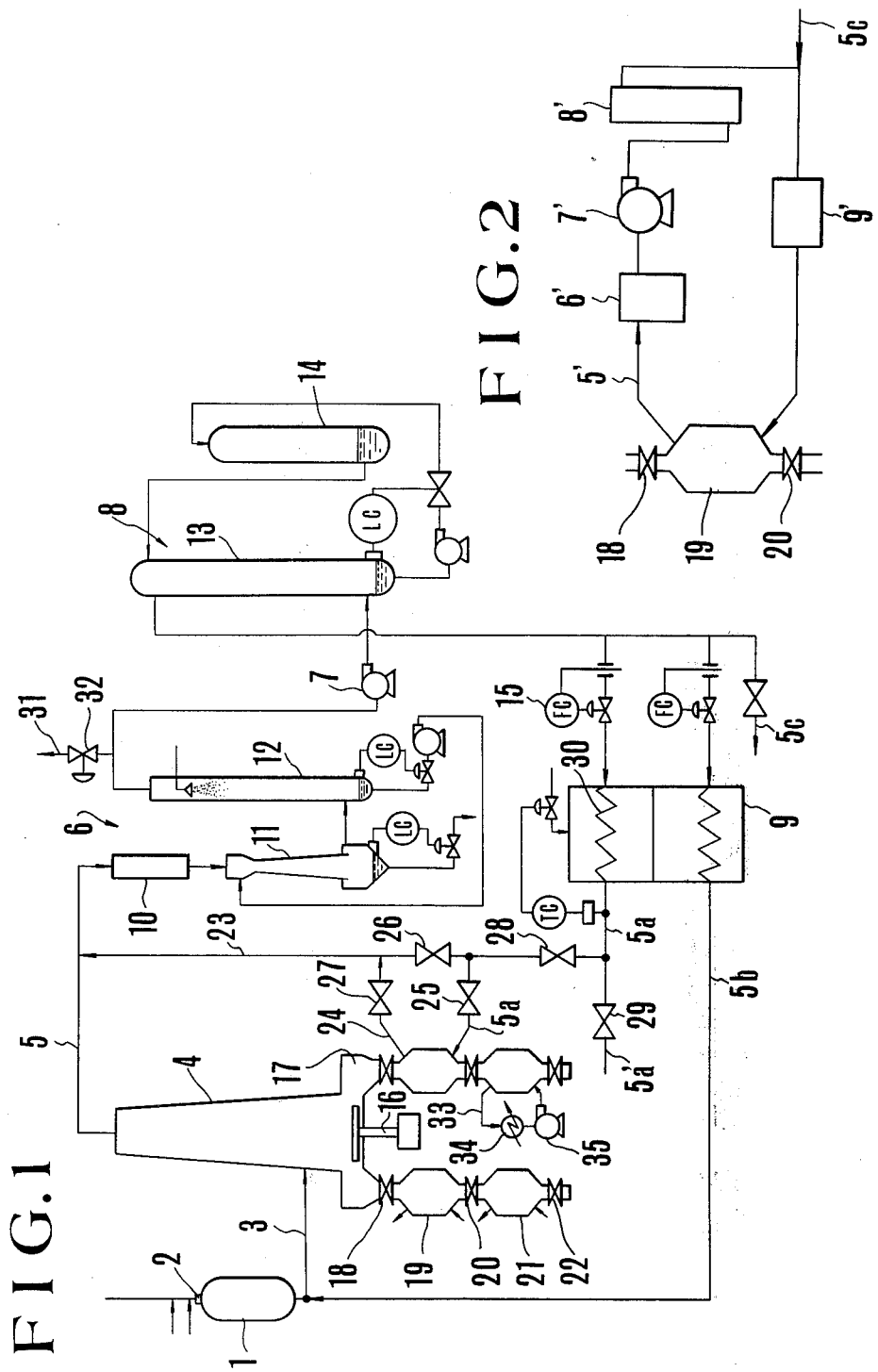

METHOD FOR PROCESSING REDUCED IRON

BACKGROUND OF THE INVENTION

The present invention relates to a method for discharging gas reduced iron from a vertical furnace at a high temperature, effecting component adjustment so as to render the reduced iron to be in a condition desirable for use in succeeding processes, and discharging the reduced iron into the exterior atmosphere after cooling the same, and an apparatus for carrying out the above method.

Grannular iron oxide, such as, for example, pellets of 10 – 30 mm in diameter which are formed by shaping powdered iron ore substantially of uniform size, pellets or briquettes formed from the mixture of powdered iron ore and collected dust (mainly of iron oxide powder), or grannular iron ore obtained by crushing a mass of ore and sizing them into a size ranging from about 10 to about 30 mm, is charged to the top of the vertical furnace. On the other hand, reducing gas held at a predetermined temperature is introduced into the vertical furnace at the bottom thereof, so that the reducing gas flows upwardly in the furnace in counter-flow to the iron oxide in contact therewith thereby effecting reduction of the iron.

The above described reduced iron descends in the vertical furnace while the gas reduction proceeds and is discharged from the bottom of the furnace and received in cooling receptacles. After cooling, the reduced iron is used as a raw material for the manufacture of steel.

On the other hand, the reducing gas blown into the furnace is discharged from the top of the furnace after is has been used in gas reduction of the iron oxide during its rising through the furnace. The thus discharged waste gas is processed in a gas recirculating system so that the water component and carbon dioxide are removed therefrom. Alternately, a part of the carbon dioxide is maintained therein, and fuel is newly supplied to the thus processed gas so as to effect denaturation thereof and the thus denatured gas is supplied to the vertical furnace for the gas reduction of the iron oxide. It may also be used in heat exchange with the fuel and other medium in the recirculation system or it is cooled by the other medium to make a low temperature reducing gas so that it is used as a cooling medium for the reduced iron in the vertical furnace. To effect the above processes, various methods and apparatuses are well known.

As to the means for producing the reducing gas used in the gas reduction of iron ore, the method of obtaining high temperature reducing gas by partially oxidizing heavy oil, natural gas and other hydrocarbon fuels in the presence of oxygen, the method of improving the nature of the above described fuel by water vapor in the presence of a catalyst (steam reforming), or the method of improving the nature of the above described fuel by using $CO_2$ as a source of oxygen in the presence of a catalyst are suitable.

In producing the above described reducing gas, it is preferred that the amount of impurities, particularly, the amount of sulfur, contained in the fuel are low. However, since the amount of production of such a high quality fuel is limited and it is expensive, fuel having a high content of sulfur must be used.

When a reducing gas is produced from a sulfur containing fuel, such as, a heavy oil containing 0.2% of sulfur, and the reducing gas is used in reducing iron oxide, the content of sulfur in the reduced iron reaches 0.05 – 0.1%, thereby remarkably deteriorating the quality of the reduced iron and making the succeeding processes very complicated and troublesome.

In the catalyst contact process, when the sulfur content of the fuel and other medium is more than 0.001%, the ability of the catalyst used is severely deteriorated so that frequent exchange of the catalyst is required. Therefore, it is desired to desulfurize the fuel prior to the production of the reducing gas. However, the provision of desulfurizing equipment only for the desulfurization of the fuel makes the production cost of the reduced iron very high.

SUMMARY OF THE INVENTION

It is the object of the present invention to provide a method and apparatus for solving the above described problems.

The first characteristic feature of the present invention lies in a method of processing reduced iron in which grannular iron oxide charged into a vertical furnace is reduced by a reducing gas consisting mainly of carbon monoxide, hydrogen, and a substantial part of the waste gas generated in the reducing processes is regenerated in a recirculating system so as to be sensed, the method being characterized by continuously discharging the thus reduced iron in the vertical furnace therefrom at a temperature higher than 500° C and under conditions which are protected or isolated from the exterior atmosphere, receiving the thus discharged reduced iron in a plurality of air tight sealable component adjusting receptacles thereby effecting component adjustment of the reduced iron in the receptacles by the regenerated reducing gas which is heated to a temperature ranging from 700° to 1100° C, thereafter, discharging the thus component adjusted reduced iron in the absence of air so as to be received in air tight sealable cooling receptacles, and discharging therefrom the reduced iron after cooling it below 100° C.

The second feature of the present invention lies in an apparatus of processing reduced iron provided with a charging device of iron oxide, a cutting and discharging device of the reduced iron, a gas generating device for partially oxidizing the fuel and a gas recirculating system of the waste gas, the apparatus being characterized in that the recirculating system of the gas is constituted by arranging in a piping system connected to the top of the vertical furnace, a cooling-washing device, a compressor, an acidic gas removing device for removing $CO_2$, $H_2S$ and the like, and a heating device, the cutting and discharging device being provided at the lower portion of the vertical furnace, the discharging device being communicated with a plurality of air tight sealable component adjusting receptacles, the component adjusting receptacles being communicated with air tight sealable cooling receptacles, one of the branches branching from one end of the gas recirculating system being connected to the component adjusting receptacles, a gas discharging pipe for discharging the waste gas after processing being connected to the inlet side of the piping system of the gas recirculating system, and the other of the branches being connected to a piping system connecting the gas generating device to the vertical furnace.

The third feature of the present invention lies in an apparatus of processing reduced iron provided with a charging device for iron oxide, a discharging device of reduced iron, a gas generating device for partially oxidizing the fuel and a gas recirculating system for the waste gas, the apparatus being characterized in that the gas recirculating system is constituted by arranging in the piping system connected to the top of the vertical furnace a cooling-washing device, a compressor, an acidic gas removing device for removing $CO_2$, $H_2S$ and the like and a heating device, the discharging device being provided at the lower portion of the vertical furnace, a plurality of air tight sealable component adjusting receptacles being communicated with the discharging device, the component adjusting receptacles being communicated with air tight sealable cooling receptacles, the component adjusting receptacles being provided with a gas processing system in which a washing-cooling device, a compressor, an acidic gas removing device and a heating device are arranged, the piping system of the regenerated reduced gas in the gas recirculating system being connected to the inlet side of the piping system of the heating device of the gas processing system and one end of the piping system of the gas recirculating system being connected to the piping system connecting the gas generating device to the vertical furnace.

BRIEF DESCRIPTION OF THE DRAWINGS

FIG. 1 is a schematic view showing the embodiment of the general circulating system of the present invention; and FIG. 2 is a fragmentary view showing an alternative embodiment for supplying regenerated reducing gas to component adjusting receptacles.

DETAILED DESCRIPTION OF THE PREFERRED EMBODIMENTS

In carrying out the present invention, the reducing gas having CO and $H_2$ as its main components is used in effecting the reduction of the iron oxide charged in the vertical furnace. As to the method of producing the reducing gas, it is very important to treat the sulfur contained in the fuel as described previously. In the present invention, the partial oxidation process is adopted.

The high temperature reducing gas held at 1500° C, for example, which is produced by the above process is mixed with the regenerated reducing gas held at a predetermined temperature so that the temperature of the mixture is adjusted to a temperature ranging from 700° to 1100° C, and thereafter, the mixture is introduced into the lower end of the reducing region in the vertical furnace as described below. In this case, when the temperature of the reducing gas to be blown into the vertical furnace is lowered below 700° C, the reduction efficiency of the reducing gas is lowered.

On the other hand, when the temperature of the reducing gas exceeds 1100° C, considerable fusing of the iron oxide will take place. The reducing gas of the temperature ranging from 700° to 1100° C blown into the furnace contacts with the iron oxide in the furnace in counter flow thereto so that the gas reduction proceeds. The iron oxide is reduced while it successively descends and, at the time it is discharged from the furnace, it is rendered to reduced iron of the reduction rate of 97%.

The waste gas at a temperature of 300° – 800° C discharged from the top at a furnace after it is used in the reducing process is introduced into the gas recirculating system so that the regenerating process of the gas is effected therein.

The first step of the regenerating processes of the waste gas in the present invention is to have the waste gas contact with cooling water so as to cool and wash the gas. By this step, the temperature of the processed gas is lowered to a temperature preferred for removing $CO_2$ and $H_2S$ in the gas. Further, by the above described cooling-washing treatment, substantial part of the water component and dust is removed.

As a part of the cooling-washing process of the waste gas, cooling means (such as a heat exchanger) may be used in which the waste gas is indirectly contacted with the cooling medium.

The second step of the regenerating processes of the waste gas in the present invention is to absorb and remove the acidic components such as $CO_2$ and $H_2S$ and the like contained in the gas by contacting the gas with basic substance having the ability to absorb the acidic components after the cooled gas is compressed.

As to the basic substance, ethanol amine, potassium carbonate, sodium carbonate, caustic potash, caustic soda and the like may be used.

The step for removing $CO_2$, $H_2S$ and the like in the gas may be carried out in parallel to the first step of cooling-washing operation after heat-exchange. In this case, cooling water to which ammonia, one of the basic substance, is added is used.

By the first and second steps described above, the impurities in the gas can be reduced to $CO_2$: less than 2%; $H_2O$ : less than 4%; $H_2S$: less than 0.005%, for example, and the regenerated reducing gas having more than 94% of the reduced components (CO; $H_2$) is obtained.

The third step of the regenerating processes of the waste gas in the present invention is to heat a part of the regenerated reducing gas.

The heating temperature of the reducing gas is varied depending upon the purpose of use of the regenerated reducing gas (component adjusting process of the reduced iron, control of the temperature of the high temperature reducing gas, etc., for example) of the time at which the reducing gas is used.

As a means for heatng the regenerated heating gas to the desired temperature, individual heating devices may be used by which the reducing gas is indirectly heated. In using such heating means, the heating temperature can be controlled by adjusting the amount of fuel supplied to the heating devices.

As to an alternative form of the heating means of the regenerated reducing gas, such means may be used in which the reducing gas is passed through a plurality of piping systems arranged in an indirect heating device so as to heat the gas flowing through each of the piping systems individually to a high temperature, while a part of the regenerated reducing gas is bypassed prior to heating the same and the bypassed gas is mixed with the heated gas so as to control the heating temperature of the mixture by adjusting the amount of bypassed gas to be mixed with the heated gas.

Sulfur components in the reducing gas blown into the vertical furnace are transferred to the reduced iron subjected to gas reduction in the furnace and the content of the sulfur in the reduced iron as it is cut and discharged from the furnace reaches 0.05 – 0.1%. The reduced iron has an actual temperature of 700° – 1100° C.

One of the characteristic features of the present invention lies in the fact that the reduced iron at a temperature of 700° – 1100° C is discharged and is preferably maintaining such a temperature without positively cooling it and it is subjected to component adjustment in receptacles provided separately.

When the reduced iron at a temperature of 700° – 1100° C is discharged from the vertical furnace, continuous discharging thereof is effected in order to make the condition of operation of the vertical furnace more stable. In this case, the discharging device is preferably cooled forcibly in order to prolong the life of the discharging device. However, when the temperature of the reduced iron is lowered too much by increasing the cooling effect to the discharging device provided at the bottom of the vertical furnace, the atmosphere in the furnace will be made unstable. On the other hand, when the temperature decrease of the reduced iron is made too much, it will take too much time to raise the temperature thereof to a temperature desirable for component adjustment thereof as described later, and the efficiency of the component adjustment is lowered.

The method of the present invention is carried out in such a manner that the continuous discharging of the reduced iron from the vertical furnace is effected without lowering the temperature of the reduced iron below 500° C.

The discharging of the reduced iron held at a temperature above 500° C can be adjusted by controlling the cutting speed and adjusting the cooling rate and the like.

When the reduced iron held at a temperature above 500° C is contacted with the exterior atmosphere while the reduced iron is continuously discharged from the furnace, rapid oxidation will proceed thereby deteriorating the quality of the reduced iron and, in some cases, making it impossible to use the reduced iron as raw material for steel manufacture.

In accordance with the present invention, the reduced iron is continuosly discharged from the furnace under the condition that it is isolated from the exterior atmosphere and it is received in airtight sealable component adjusting receptacles. In this case, since the volume of the receptacles is limited, two or more receptacles are juxtaposed. In other words, while component adjustment is effected in one of the receptacles as described later, the other receptacles are receiving reduced iron continuously discharged from the furnace.

The above described component adjusting process of the reduced iron is carried out by effecting cooling-washing process and acidic component removal process in the gas recirculating system and contacting the thus processed reduced iron with regenerated reducing gas heated to a desired temperature.

In order to carry out effectively the above described component adjusting process of the reduced iron, the temperature of the atmosphere in the process is controlled so as to be in the range of 700° – 1100° C for the reason described later.

As previously described, the sulfur component transferred to the reduced iron by the gas reduction thereof is present mainly in the form of FeS, and it is desulfurized by hydrogen in the reducing gas following the equation below:

$$FeS + H_2 \rightarrow Fe + H_2S \qquad (1)$$

The reaction rate of the desulfurization reaction tends to be increased as the reaction is effected at higher temperature. However, if the reaction temperature is too high, fusing of the reduced iron will occur. Therefore, the upper limit of the temperature of the atmosphere in the desulfurization process is preferably set to 1100° C.

In accordance with the tests carried out by the present inventors, it is possible to effect the desulfurization process of the reduced iron in the atmosphere held at a temperature of 700° – 1100° C, and the desulfurization can be carried out most effectively and under the most stable condition at a temperature ranging from 900° – 1100° C. By the above described desulfurization process, sulfur components existing in the form of FeS in the iron oxide are also removed.

In accordance with the present invention, a cementation process of the reduced iron can also be carried out together with the above described desulfurization process. In other words, the carbon component in the reducing gas is transferred to the reduced iron by exposing the reduced iron to the atmosphere held at 700° – 1100° C thereby permitting the cementation to be effected.

Thus, $$3Fe + 2CO \rightarrow Fe_3C + CO_2 \qquad (2)$$

The above described cementation reaction of the reduced iron varies to certain extent depending upon the reduction rate of the reduced iron, the nature of the surface of the reduced iron and the ratio of CO relative to $CO_2$ in the reducing gas. When the condition $$\frac{CO}{CO_2} > 10$$

is satisfied, the cementation is most effectively carried out at a temperature of the atmosphere ranging from 700 to 800° C.

Since the above described cementation process consumes the CO component in the reducing gas and forms $CO_2$ so that the cementation rate is deteriorated, a sufficient amount of the regenerated reducing gas containing CO of 200 – 500 Nm³/t, for example, is required to be circulated for properly proceeding with cementation. The speed of the cementation reaction is deteriorated as the temperature of the reaction is raised.

As described above, in the component adjusting process of the reduced iron, it is desulfurized by contacting the same with the regenerated reducing gas in the atmosphere held at a temperature of 700° – 1100° C and the cementation thereof proceeds. In order to effectively carry out the above described processing, the regenerated reducing gas is continuously supplied to the component adjusting receptacles while the used gas is continuously discharged therefrom so as to maintain the atmosphere in the receptacles in the active state at all times.

The above described discharged gas is processed for the regeneration thereof by leading the same to the inlet side of a gas recirculating system as shown in FIG. 1. In this case, pressure variation takes place in the gas recirculating system so that the furnace pressure of the vertical furnace is varied thereby disturbing the operation of the furnace. Therefore, a diffusing system is provided midway of the gas recirculating system, i.e., after the cooling-washing process, for example, so as to adjust the pressure in the system.

An alternative embodiment of the processing system of the discharged gas is shown in FIG. 2. In FIG. 2 a separate exclusively used gas recirculating system having a function similar to the gas recirculating system shown in FIG. 1 is connected to the component adjusting receptacle, so that the reducing gas supplied thereto is adjusted correspondingly to the amount of the gas consumed, thereby permitting the regenerated reduced gas from the gas recirculating system shown in FIG. 1 to be compensated.

When the component adjusting process of the reduced iron is completed, the reduced iron is discharged under the condition isolated from the exterior atmosphere and received in airtight sealable cooling receptacles.

The cooling process of the reduced iron makes the degree of oxidation of the reduced iron very slowly when the same contacts with the exterior atmosphere. According to the tests made by the present inventors, it has been proved that the reoxidation of the reduced iron is sufficiently suppressed by cooling the same to a temperature below 100° C. In this case, if the reduced iron is cooled to the atmospheric temperature, better results will be obtained. The time required for cooling the reduced iron held at 700° – 1100° C to a temperature below 100° C by the above cooling process corresponds to the cycle of the preceeding component adjusting process. As to the method of cooling, air cooling or forced cooling may be adopted, in which forced cooling non-oxidizing gas such as, an inert gas, reducing gas and the like, for example, is forcibly circulated. Other forced cooling methods may also be adopted optionally.

The reduced iron having been cooled to a temperature below 100° C as described above is discharged from the cooling receptacles so that it may be stored or used as raw material for stut manufacture.

In accordance with the present invention, since the reduced iron is continuously discharged from the vertical furnace at a temperature higher than 500° C while it is isolated from the exterior atmosphere, and it is subjected to component adjustment under the airtight sealed condition, the atmosphere in the component adjusting process will not affect directly the reduced iron as the exterior disturbance by the atmosphere in the vertical furnace, and the component adjusting process of the reduced iron can be carried out very efficiently, thereby permitting reduced iron having a high quality and including a very low sulfur component or having an appropriate content of carbon satisfying the requirement for the succeeding process to be obtained at a high reduction rate.

Further, in the present invention, since the reduced iron is isolated from the exterior atmosphere after it has been subjected to the component adjusting process and, thereafter, it is subjected to a cooling process under the airtight condition, reduced iron which is difficult to reoxidize is obtained and it is possible to store the thus processed reduced iron in the atmosphere.

Now, the method of the present invention will be described with reference to the apparatus for carrying out the present invention illustrated in the accompanying drawings.

In FIG. 1, a gas generating furnace 1 is lined at the inner periphery thereof with refractory material. The furnace 1 has burners 2 to which fuel such as heavy oil, oxygen or air (and water vapor) and the like is supplied so that partial oxidation takes place thereby generating reducing gas of high temperature. The high temperature reducing gas is mixed with regenerated reducing gas supplied from pipe 5b described below during the time the high temperature gas is supplied to vertical furnace 4 through pipe 3 so that the temperature of the mixture is controlled. In the present invention, the temperature of the mixture is controlled to a blowing temperature ranging from 700° to 1100° C and it is blown into the bottom of the reducing region of the vertical furnace 4.

The control of the temperature of the high temperature reducing gas is effected by mixing the same with regenerated reducing gas of a predetermined temperature supplied from the gas recirculating system illustrated in the drawing as described above or by mixing the high temperature reducing gas with a reducing gas supplied from a separate supply.

Pipe 5 is provided at the top of the vertical furnace 4 for circulating the waste gas discharged from the top of the furnace 4. Cooling-washing device 6, compressor 7, absorbing device 8 and heating device 9 are provided in the pipe 5 so that a gas recirculating system is constituted.

The cooling-washing device 6 is constituted by heat exchanger 10, dust collector 11 for collecting dust of relatively large size and water spray device 12 for collecting dust of small size. The compressor 7 is adapted to raise the pressure of the waste gas to be regenerated to a pressure required for blowing the same through the gas recirculating system under stable conditions.

The absorbing device 8 is constituted by absorbing tower 13 and regenerating tower 14. The absorbing tower 13 sprinkles basic substance, such as, monoethanolamine so as to contact with the gas having been subjected to cooling-washing in counter-flow thereto so that acidic gas such as $CO_2$, $H_2S$ and the like in the gas is absorbed, while the regenerating tower 14 regenerates monoethanolamine.

The heating device 9 is adapted to heat the regenerated reducing gas to temperatures preferred for the respective purposes of use. The heating device 9 shown in FIG. 1 comprises a plurality of heating units juxtaposed to each other. The control of the heating temperature of the regenerated reducing gas by the respective heating units is effected by adjusting the amount of fuel supplied thereto.

Alternative embodiment (not shown) of the heating device 9 may be a heating means in which the regenerated reducing gas is passed through a plurality of pipes arranged in a single heating device so that the gas in the respective pipes is heated to a predetermined temperature, and the control of the temperature of the gas is effected by mixing the heated gas the adjusted amount of low temperature reducing gas which is bypassed through the bypass pipes provided exterior of the heating device in parallel to the plurality of pipes passing through the heating device so that the gas flowing through the bypass pipes is held at a low temperature.

The temperature of the heated regenerated reducing gas varies depending upon the purpose of use. For example, in case the temperature of the gas mixture is to be made a temperature desirable for blowing into the vertical furnace by mixing the same with the high temperature reducing gas, the heated regenerated reducing gas is heated to a temperature lower than the reducing gas of 700° – 1100° C to be blown into the furnace.

In case the gas is used for the component adjusting process, the regenerated reducing gas is heated to a temperature equal to or somewhat higher than the temperature of the atmosphere preferable for the processing (700° – 1100° C).

As described above, since the regenerated reducing gas passing through the heating device 9 is mixed with the high temperature reducing gas so as to be blown into the vertical furnace 4 or blown into the component adjusting receptacles 19, the flow rate of the regenerated reducing gas in the respective pipes is controlled by the flow control devices 15 provided at the inlet side of the heating device 9 so that the regenerated reducing gas of the appropriate amount for the respective use is obtained.

On the other hand, discharging device 16 is provided at the bottom of the vertical furnace 4. Here, a rotary table type discharging device 16 is illustrated. The discharging device 16 is usually cooled.

A plurality of discharge openings 17 are provided in the discharging device 16. The component adjusting receptacles 19 are connected to the respective discharging openings 17 through opening and closing valves 18. Cooling receptacles 21 are connected to the lower ends of the respective component adjusting receptacles 19 through opening and closing valves 20. Opening and closing valves 22 are provided at the lower portions of the respective receptacles 21.

The above described opening and closing valves 18, 20, 22 are adapted to pass therethrough the reduced iron when opened while they support and hold the reduced iron lying thereabove and prevent the passage of the atmosphere therethrough when closed. The valves may be in the form of sluice valves, ball valves, cocks and seal valves (not shown).

Branch pipe 5a of the pipe 5 of the gas regenerating circulating system is connected to the lower portion of the component adjusting receptacles 19. A pipe 23 is connected at its one end to the midway of the branch pipe 5a, and the other end of the branch pipe 5a is connected to the pipe 5. The connecting point to the pipe 5 is at the inlet side of cooling-washing device 6.

The other end of the waste gas discharging pipe 24 connected to the component adjusting receptacles is connected to the pipe 23.

Valves 25, 26 and 27 are provided in the branch pipe 5a, the pipe 23 and the waste gas discharging pipe 24, respectively.

The valve 26 is closed when the heated regenerating reducing gas is supplied to the component adjusting receptacle 19 through the branch pipe 5a and the gas used is discharged through the pipes 24, 23.

When the supply of the regenerated reducing gas is to be switched to another component adjusting receptacle 19 after completion of the processing in one of the receptacles 19, the valve 26 is opened and the valves 25, 27 are closed, so that the flow of the heated regenerated reducing gas through the branch pipe 5a is maintained and the valve 28 in the branch pipe 5a and the valve 29 in the branch pipe 5a' are operated so as to effect the switching.

As described above, since the valves are operated for the switching, the tube 30 of the heating device 9 is subjected to no substantial pressure load.

The gas continuously discharged from the component adjusting receptacles 19 or the gas discharged during the switching operation is supplied to the pipe 5 through the pipe 23. In this case, the pressure in the pipe 5 varies and the variation in pressure in the pipe 5 directly influences on the pressure in the vertical furnace 4.

In order to avoid the influence of the pressure variation in the vertical furnace 4, diffusing pipe 31 having a valve 32 is provided between the cooling-washing device 6 and the compressor 7 so that the pressure in the piping system 5 is maintained in a predetermined range of level by operating the valve 32.

FIG. 2 shows another embodiment for supplying the regenerated reducing gas to the component adjusting receptacles 19. In this embodiment, the gas recirculating system in the form of a closed circuit is connected to the component adjusting receptacles 19. This gas recirculating system is substantially similar to that illustrated in FIG. 1, and a cooling-washing device 6', a compressor 7', an absorbing device 8' and a heating device 9' are provided in the piping system 51.

Since the processing operation in the component adjusting receptacles 19 requires the consumption of the reducing components in the regenerated reducing gas, the pipe 5' is connected to the branch pipe 5c shown in FIG. 1 so as to replenish the regenerated reducing gas from the pipe 5'.

In case the gas circulating circuit for component adjusting process as shown in FIG. 2 is used, no influence is given on the pressure in the gas circulating circuit of the gas recirculating system of the vertical furnace 4 thereby making it possible to easily control the pressure in the vertical furnace 4.

A gas circulating pipe 33 is connected to the cooling receptacles 21 for circulating cooling gas. A heat exchanger 34 and a compressor 35 are provided in the pipe 33. Thus, when nitrogen gas is circulated in the pipe 33, forced cooling is given to the cooling receptacles 21.

When the regenerated reducing gas at low temperature is to be supplied to the cooling receptacles 21, cooled waste gas (not shown) is flown into the pipe 23 and low temperature reducing gas may be circulated in the cooling receptacles 21.

The branch pipe 5b of the above described gas recirculating system is connected to the pipe 3 in which the high temperature reducing gas flows. The controlled amount of the regenerated reducing gas held at the controlled temperature which is supplied from the branch pipe 5b is mixed with the controlled amount of the high temperature reducing gas produced in the gas generating furnace so that the temperature of the mixture is set to a temperature desirable for blowing into the vertical furnace 4.

Since the apparatus of the present invention is constructed as described above, an example of the operation thereof is as follows. In the apparatus shown in FIG. 1, for example, high temperature reducing gas at about 1500° C was produced in the gas generating furnace 1 at the rate of 2500 Nm³/hr, the thus produced high temperature reducing gas was mixed with 3500 Nm³/hr of the regenerated reducing gas at 650° C supplied from the branch pipe 5b of the gas recirculating system so that the temperature of the mixture of the reducing gas of 6000 Nm³/hr was controlled to about 900° C. The thus controlled reducing gas was blown into the reducing region of the vertical furnace 4 at a rate of 6000 Nm³/hr. Pellets of iron oxide was charged to the vertical furnace 4 at a rate of 100 t/D while the reduced iron held at 900° C was discharged continuously from the bottom of the furnace at a rate of 75 t/D. In discharging the reduced iron from the furnace, the temperature of the reduced iron was lowered to 750° C. The reduced iron of 750° C was directly received in the component adjusting receptacles 19, while the regenerated reducing gas of 900° C was supplied to the receptacles 19 at a rate of 1500 Nm³/hr so that the component adjusting process of the reduced iron was carried out. The result is shown in Table 1.

Table 1

|  | Vertical furnace | Component Adjusting Receptacles |
|---|---|---|
| Duration and Temperature of Processing | 4 hr, 900° C | 2 hr, 900° C |
| Reduction Rate (%) | 95 | 97 |
| Content of Sulfur (%) | 0.1 | 0.013 |
| Content of Carbon (%) | 0.1 | 0.5 |

Water content was removed from the regenerated reducing gas at a rate of 950 Nm³/hr by the gas regenerating process in the gas recirculating system, and the acidic gas was also removed at a rate of 750 Nm³/hr. The regenerated reducing gas was discharged from the system at a rate of 800 Nm³/hr through the diffusing pipe 31 and the branch pipe 5c.

What is claimed is:

1. In a method for processing reduced iron in which granular iron oxide charged into a vertical furnace is reduced by a reducing gas comprising carbon monoxide, hydrogen, carbon dioxide, water and hydrogen sulfide, and a substantial part of the waste gas containing carbon dioxide, water and hydrogen sulfide resulting from the reducing process is regenerated for the reuse thereof by the removal of carbon dioxide, water and hydrogen sulfide, the improvement which comprises the steps of discharging said reduced iron having been reduced by the gas reduction in the vertical furnace and under isolation from the exterior atmosphere, said reduced iron containing sulfur and carbon, into an airtight sealable component adjusting receptacle, subjecting the reduced iron to desulfurization and carburization in said receptacle at a temperature of 700° to 1100° C by using a portion of said regenerated reducing gas, whereby the sulfur content of the reduced iron is decreased and the carbon content of the reduced iron is increased, discharging the thus treated reduced iron from the receptacle while keeping it isolated from the exterior atmosphere into an airtight sealable cooling receptacle, cooling the reduced iron in said cooling receptacle and thereafter discharging the thus cooled reduced iron from said cooling receptacle.

2. The method of claim 1 wherein the reduced iron is continuously discharged from the vertical furnace at a temperature of 500° to 1100° C.

3. In a method for processing reduced iron in which granular iron oxide charged into a vertical furnace is reduced by a reducing gas comprising carbon monoxide, hydrogen, carbon dioxide, water, and hydrogen sulfide, and a substantial part of the waste gas containing carbon dioxide, water and hydrogen sulfide resulting from the reducing process is regenerated for the reuse thereof by the removal of carbon dioxide, water, and hydrogen sulfide, the improvement which comprises the steps of discharging said reduced iron having been reduced by the gas reduction in the vertical furnace and under isolation from the exterior atmosphere, said reduced iron containing sulfur and carbon, into an airtight sealable component adjusting receptacle, subjecting the reduced iron to desulfurization in said receptacle at a temperature of 700° to 1100° C by using a portion of said regenerated reducing gas, whereby the sulfur content of the reduced iron is decreased, discharging the thus treated reduced iron from the receptacle while keeping it isolated from the exterior atmosphere into an airtight sealable cooling receptacle, cooling the reduced iron in said cooling receptacle and thereafter discharging the thus cooled reduced iron from said cooling receptacle.

4. In a method for processing reduced iron in which granular iron oxide charged into a vertical furnace is reduced by a reducing gas comprising carbon monoxide, hydrogen, carbon dioxide, water, and hydrogen sulfide, and a substantial part of the waste gas containing carbon dioxide, water and hydrogen sulfide resulting from the reducing process is regenerated for the reuse thereof by the removal of carbon dioxide, water, and hydrogen sulfide, the improvement which comprises the steps of discharging said reduced iron having been reduced by the gas reduction in the vertical furnace and under isolation from the exterior atmosphere, said reduced iron containing sulfur and carbon, into an airtight sealable component adjusting receptacle, subjecting the reduced iron to carburization in said receptacle at a temperature of 700° to 1100° C by using a portion of said regenerated reducing gas, whereby the carbon content of the reduced iron is increased, discharging the thus treated reduced iron from the receptacle while keeping it isolated from the exterior atmosphere into an airtight sealable cooling receptacle, cooling the reduced iron in said cooling receptacle and thereafter discharging the thus cooled reduced iron from said cooling receptacle.

* * * * *